(12) United States Patent
Ito et al.

(10) Patent No.: US 12,485,858 B2
(45) Date of Patent: Dec. 2, 2025

(54) VEHICLE CONTROL APPARATUS

(71) Applicant: TOYOTA JIDOSHA KABUSHIKI KAISHA, Toyota (JP)

(72) Inventors: Shogo Ito, Shizuoka-ken (JP); Kumiko Kondo, Numazu (JP); Shinya Kawamata, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 113 days.

(21) Appl. No.: 18/616,679

(22) Filed: Mar. 26, 2024

(65) Prior Publication Data
US 2024/0336241 A1 Oct. 10, 2024

(30) Foreign Application Priority Data
Apr. 7, 2023 (JP) ................. 2023-062500

(51) Int. Cl.
*B60T 7/22* (2006.01)
*B60L 7/18* (2006.01)

(52) U.S. Cl.
CPC ............ *B60T 7/22* (2013.01); *B60L 7/18* (2013.01); *B60L 2240/12* (2013.01); *B60L 2240/64* (2013.01); *B60L 2240/68* (2013.01); *B60T 2210/24* (2013.01); *B60T 2210/32* (2013.01); *B60T 2250/04* (2013.01)

(58) Field of Classification Search
CPC .... B60T 7/22; B60T 2210/24; B60T 2210/32; B60T 2250/04; B60L 7/18; B60L 2240/12; B60L 2240/64; B60L 2240/68; B60L 15/2045; B60L 2240/16; B60L 7/26; B60L 2250/26; B60L 15/2009; B60W 30/18127; B60W 30/09; B60W 30/095; B60W 30/182; B60W 2540/10
See application file for complete search history.

(56) References Cited

U.S. PATENT DOCUMENTS

| 8,355,851 B2 | 1/2013 | Inoue et al. |
| 8,370,040 B2 | 2/2013 | Inoue et al. |

(Continued)

FOREIGN PATENT DOCUMENTS

| JP | 2006-44654 A | 2/2006 |
| JP | 2015-143072 A | 8/2015 |

(Continued)

*Primary Examiner* — Frederick M Brushaber
(74) *Attorney, Agent, or Firm* — Sughrue Mion, PLLC

(57) ABSTRACT

A vehicle control apparatus comprises a sensor that obtains object information on an object that is present in front of a vehicle; a regenerative brake device that applies a regenerative brake force to a wheel; a friction brake device that applies a friction brake force to the wheel; and a control unit that performs a deceleration control to control at least one of the regenerative brake device and the friction brake device, when an execution condition is satisfied, in such a manner that a total of the regenerative brake force and the friction brake force becomes equal to a target brake force. The control unit is configured to make a maximum regenerative brake force smaller when a friction condition is satisfied than when the friction condition is not satisfied. The friction condition is satisfied when it is predicted that the target brake force will become greater than a predetermined force.

8 Claims, 7 Drawing Sheets

(56) References Cited

U.S. PATENT DOCUMENTS

| | | | |
|---|---|---|---|
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 11,458,846 B2* | 10/2022 | Fujita | B60T 8/171 |
| 2004/0122579 A1* | 6/2004 | Ashizawa | B60W 10/08 |
| | | | 701/22 |
| 2010/0076657 A1* | 3/2010 | Jinno | B60K 6/445 |
| | | | 180/65.265 |
| 2015/0222208 A1* | 8/2015 | Hisano | B60L 15/2045 |
| | | | 318/376 |
| 2017/0008400 A1 | 1/2017 | Katsuta | |
| 2019/0193570 A1* | 6/2019 | Okumura | F16D 61/00 |
| 2019/0295419 A1 | 9/2019 | Tosa et al. | |
| 2020/0353819 A1* | 11/2020 | Fujita | B60T 1/10 |
| 2022/0118981 A1 | 4/2022 | Nishimoto | |

FOREIGN PATENT DOCUMENTS

| | | |
|---|---|---|
| JP | 2015-143073 A | 8/2015 |
| JP | 2022-065285 A | 4/2022 |

\* cited by examiner

VEHICLE CONTROL APPARATUS

TECHNICAL FIELD

The present disclosure relates to a vehicle control apparatus that performs a deceleration control to control at least one of a regenerative brake device/system and a friction brake device/system in such a manner that a total/sum of a regenerative brake force and a friction brake force becomes equal to (coincides with) a target brake force.

BACKGROUND

There has been a known vehicle control apparatus configured to perform a deceleration control by making the regenerative brake device and the friction brake device cooperate with each other. The regenerative brake device is a device that applies the regenerative brake force generated when converting rotational (kinetic) energy of wheels of a vehicle into electrical energy to the wheels. The generated electrical energy is stored in a battery mounted on the vehicle. The friction brake device is a device that applies the friction brake force to the wheels by hydraulically pressing brake pads against brake discs.

For example, a vehicle control apparatus (hereinafter, referred to as a "conventional apparatus") disclosed in Japanese Patent Application Laid-Open No. 2015-143073 performs a normal brake control to decelerate the vehicle based on an operation to a brake pedal by a driver, a deceleration control due to a deceleration of a preceding vehicle during a preceding vehicle following control, and a stopping control when a pre-crash safety system is operated.

When the conventional apparatus performs the deceleration control, a ratio of the regenerative brake force to a total brake force is made smaller than when performing the normal brake control. When the conventional apparatus performs the stopping control, it sets the ratio of the above-described regenerative brake force to "0".

To achieve/generate a great brake force, it is necessary to switch from the regenerative brake to the friction brake. When the ratio of the regenerative brake force to the total brake force is large, a time length for switching the brake forces (from the regenerative brake to the friction brake) is relatively long. In view of this, when performing the deceleration control and the stopping control, the conventional apparatus sets a maximum regenerative brake force that is the regenerative brake force that can be generated during those controls at a relatively small force.

SUMMARY

The target brake force during the deceleration control and the stopping control may sometimes be great or may sometimes be small. However, the conventional apparatus sets the maximum regenerative brake force during those controls at the relatively small force constantly/uniformly. This causes a part of the electric energy to charge the battery that would be generated by the regenerative brake to be missed, when the target brake force during the deceleration control and the stopping control is small.

The present disclosure is made to cope with the problem described above. That is, one of objectives of the present disclosure is to provide a vehicle control apparatus that can shorten the switching time length for switching the brake forces from the regenerative brake to the friction brake, and can effectively recover the electric energy to charge the battery using the regenerative brake.

A vehicle control apparatus (hereinafter, referred to as a "present disclosure apparatus") according to the present disclosure comprises:
- a sensor that obtains object information on an object that is present in front of a vehicle (40,42);
- a regenerative brake device that applies/generates a regenerative brake force to/for a wheel of the vehicle (20);
- a friction brake device that applies/generates a friction brake force to the wheel (30)
- a control unit (10) that performs a deceleration control to control at least one of the regenerative brake device and the friction brake device, when it is determined, based on the object information, that an execution condition that a predetermined deceleration objective target object is present is satisfied (step 510: Yes), in such a manner that a total of the regenerative brake force and the friction brake force becomes equal to a target brake force obtained based on a relationship between the vehicle and the deceleration objective target object (step 540, step 550, step 560), wherein, the control unit is configured to make a maximum regenerative brake force that the regenerative brake device is able to generate during the deceleration control smaller when a friction condition is satisfied (step 535: Yes) than when the friction condition is not satisfied (step 540), the friction condition being a condition to be satisfied when it is predicted, based on the object information, that the target brake force will become greater than a predetermined brake force.

The present disclosure apparatus sets, when the friction condition becomes satisfied, the maximum regenerative brake force to a value smaller than a value of when the friction condition is not satisfied. Accordingly, since the maximum regenerative brake force is relatively small when the friction condition is satisfied, the above-described switching time length can be shortened. In addition, since the present disclosure apparatus does not make the maximum regenerative brake force smaller when the friction condition is not satisfied, it can utilize/obtain the regenerative brake force effectively.

In one of embodiments of the present disclosure apparatus,
the control unit is configured to make the maximum regenerative brake force greater when the regenerative condition is satisfied (step 545: Yes) than when the regenerative condition is not satisfied (step 550), the regenerative condition being the condition to be satisfied when it is inferred that the driver desires the deceleration control in which the regenerative brake force is prioritized.

Accordingly, since the maximum regenerative brake force is greater when the regenerative condition is satisfied, the deceleration control in accordance with the driver's intention can be carried out.

In the above-described embodiment,
the control unit is configured to determine whether to make the maximum regenerative brake force greater or smaller depending on a kind of the deceleration objective target object when both of the friction condition and the regenerative condition are satisfied (step 555: No) than when any of the friction condition and the regenerative condition is not satisfied (step 565, step 540, step 550).

A probability (contact probability) that the deceleration objective target object contacts/collides with the vehicle varies depending on a kind of the deceleration objective target object. When the deceleration objective target object is an object having the high contact probability, it is likely that a great brake force will be required to prevent or mitigate the contact. According to this embodiment, when both of the friction condition and the regenerative condition are satisfied, whether or not the maximum regenerative brake force is made greater or smaller is determined depending on the kind of the deceleration objective target object. Therefore, when the deceleration objective target object is the object having the high contact probability, a possibility of preventing or mitigating the contact can be increased by shortening the above-described switching time length. Whereas, when the deceleration objective target object is the object having the low contact probability, the deceleration control in accordance with the driver's intention can be carried out.

In the above-described embodiment,
the control unit is configured to make the maximum regenerative brake force smaller (step 540) if the kind of the deceleration objective target object is a preceding vehicle that is present in front of the vehicle and is traveling in the same direction as a traveling direction of the vehicle (step 560: Yes) when both of the friction condition and the regenerative condition are satisfied (step 555: No) than when any of the friction condition and the regenerative condition is not satisfied.

According to this, the above-described switching time length can be shortened when the deceleration objective target object is the object having the high contact probability, and thus, a possibility of preventing or mitigating the contact can be increased.

In the above-described embodiment,
the control unit is configured to make the maximum regenerative brake force greater (step 550) if the kind of the deceleration objective target object is either a curved road or a stopping indicating object to direct a stop of the vehicle (step 565: No) when both of the friction condition and the regenerative condition are satisfied (step 555: No) than when any of the friction condition and the regenerative condition is not satisfied.

According to this, when the deceleration objective target object is the object having the low contact probability, the deceleration control in accordance with the driver's intention can be carried out.

In one of embodiments of the present disclosure apparatus,
the control unit is configured to determine that the friction condition is satisfied when any one of a first friction condition (step 615: Yes), a second friction condition (step 660: Yes), and a third friction condition (step 680: Yes) is satisfied,
the first friction condition being a condition to be satisfied when a collision indicative value between "the vehicle" and "a preceding vehicle that is present in front of the vehicle and is traveling in the same direction as a traveling direction of the vehicle" is equal to or greater than a threshold (step 615: Yes);
the second friction condition being a condition to be satisfied when a curved road is present in front of the vehicle, and a speed of the vehicle is equal to or higher than a curved road speed threshold that is determined in accordance with a curvedness (e.g., curvature radius) of the curved road (step 660: Yes); and
the third friction condition being a condition to be satisfied when a stopping indicating object to direct a stop of the vehicle is present in front of the vehicle,
and a speed of the vehicle is equal to or higher than a stop speed threshold that is determined in accordance with a distance to the stopping indicating object (step 680: Yes).

When any one of the first friction condition, the second friction condition, and the third friction condition becomes satisfied, it is likely that the target brake force will become equal to or greater than the predetermined brake force. Accordingly, the present embodiment determines that the friction condition becomes satisfied when any one of the first friction condition, the second friction condition, and the third friction condition becomes satisfied, so as to make the maximum regenerative brake force smaller.

In one of embodiments of the present disclosure apparatus,
the control unit is configured to:
apply a greater driving force to the vehicle as an operation amount of an acceleration operation element that is operated in order for the driver to accelerate the vehicle is greater; and
determine whether or not the regenerative condition is satisfied based on the change (a change amount) in the operation amount (step 730, step 735).

The regenerative brake has a first property that the response time is short (its response is quick), a second property that it can decelerate the vehicle VA precisely and smoothly, and a third property that it can charge the battery mounted on the vehicle. Whether or not the driver desires the deceleration control utilizing these properties can be determined based on the change in the operation amount of the acceleration operation element. Since the present embodiment can determine whether or not the regenerative condition is satisfied based on the change in the operation amount of the acceleration operation element, it can accurately/properly determine the driver's intention described above.

In the above-described embodiment,
the control unit is configured to determine that the regenerative condition is satisfied when any one of a first regenerative condition (step 735), a second regenerative condition (step 740, step 745), a third regenerative condition (step 750), and a fourth regenerative condition (step 715, step 765) is satisfied,
the first regenerative condition being a condition to be satisfied when a decreasing rate indicative of a decreasing amount of the operation amount per unit time is equal to or greater than a predetermined first rate threshold (step 735: Yes);
the second regenerative condition being a condition to be satisfied when the decreasing rate is equal to or smaller than a predetermined second rate threshold that is smaller than the first rate threshold (step 740: Yes), and the target brake force is equal to or smaller than a predetermined brake force threshold (step 745; Yes);
the third regenerative condition being a condition to be satisfied when an absolute value of an operation rate indicative of an increasing amount or a decreasing amount of the operation amount per unit time is equal to or smaller than a third rate threshold that is smaller than the second threshold amount (step 750: Yes); and
the fourth regenerative condition being a condition to be satisfied when the speed of the vehicle is equal to or higher than a predetermined speed threshold (step 715: Yes), and neither the acceleration operation element nor a deceleration operation element that is operated in order for the driver to decelerate the vehicle has been operated for a predetermined time (step 765: Yes).

When the above-described first regenerative condition becomes satisfied, the driver has been rapidly releasing the acceleration operation element, and thus, it is inferred that the driver desires the deceleration in which the above-described first property is utilized.

When the above-described second regenerative condition becomes satisfied, the driver has been slowly releasing the acceleration operation element, and thus, it is inferred that the driver desires the deceleration in which the above-described second property is utilized.

When the above-described third regenerative condition becomes satisfied, the driver has been releasing the acceleration operation element extremely slowly, and thus, it is inferred that the driver desire the deceleration in which the above-described third property is utilized.

When the above-described fourth regenerative condition becomes satisfied, the driver is letting the vehicle coasting, and thus, it is inferred that the driver desire the deceleration in which the above-described third property is utilized.

In this manner, when one of the above-described regenerative conditions becomes satisfied, the maximum regenerative brake force is made greater to decelerate the vehicle with the regenerative brake as much as possible.

In one of embodiments of the present disclosure apparatus, the vehicle control apparatus is configured to be able to selectively set the vehicle to a normal mode or an eco-mode to improve a fuel consumption of the vehicle as compared to the normal mode; and the control unit is configured to determine that the regenerative condition is satisfied when the eco-mode is set.

When the eco-mode is set, it is inferred that the driver desires the deceleration in which the above-described third property is utilized. Therefore, the maximum regenerative brake force is made greater to decelerate the vehicle with the regenerative brake as much as possible.

Notably, in the above description, in order to facilitate understanding of the present disclosure, the constituent elements of the disclosure corresponding to those of the embodiment of the disclosure which will be described later are accompanied by parenthesized names and/or symbols which are used in the embodiment. However, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

DETAILED DESCRIPTION (Configuration)

Figure 1:
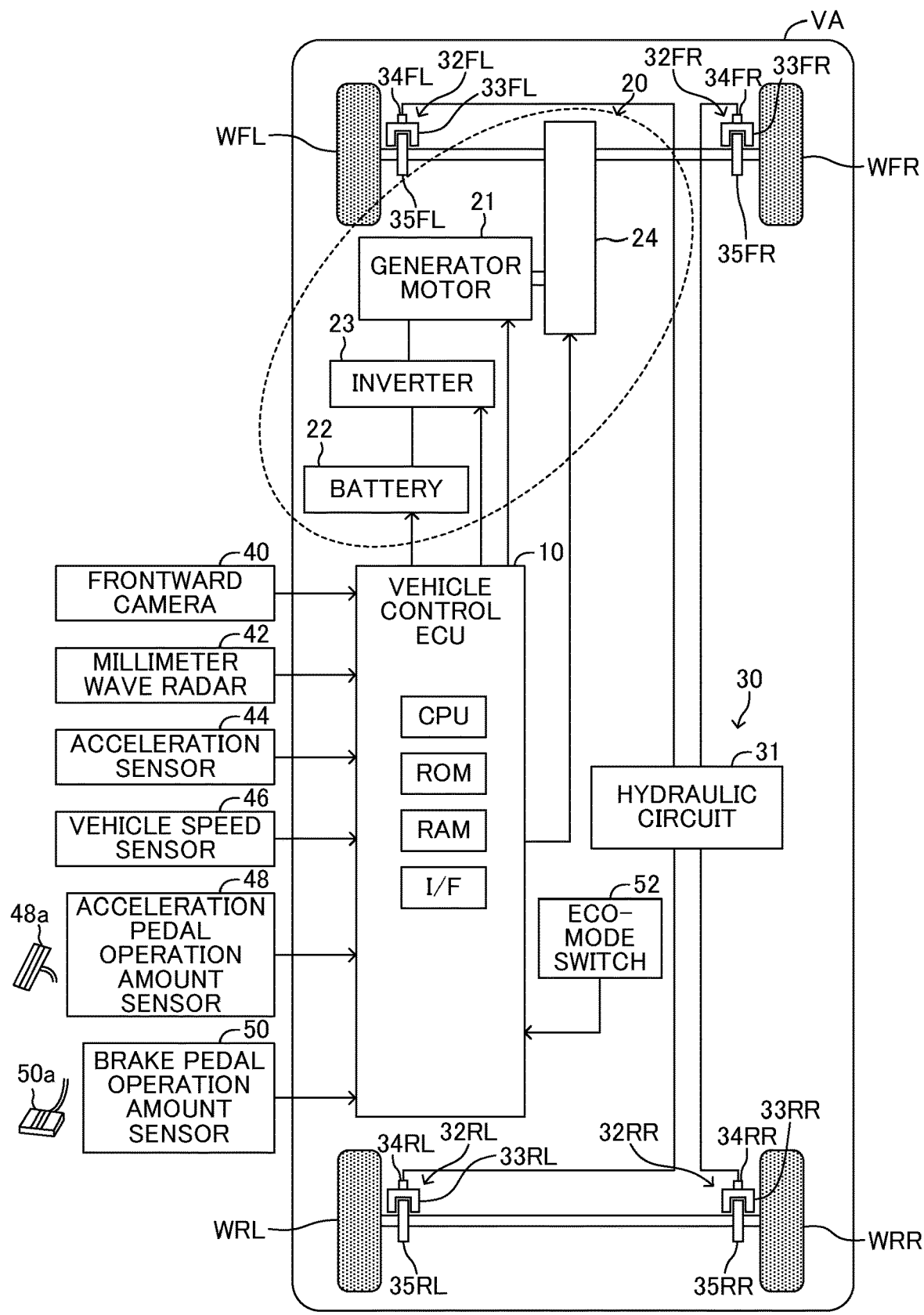
FIG. 1 is a schematic system diagram of a vehicle control apparatus according to an embodiment of the present disclosure.

As shown in FIG. 1, a vehicle control apparatus (hereinafter, referred to as a "present apparatus") according to an embodiment of the present disclosure is applied to a vehicle VA. The vehicle VA comprises a regenerative brake device/system 20 and a friction brake device/system 30. Hereinafter, a vehicle control ECU 10 is expressed as an "ECU 10". The ECU 10 may sometimes be referred to as a controller or a computer.

The ECU 10 is an abbreviation of an electronic control unit 10, that is an electronic control circuit including a microcomputer as a main component. The microcomputer includes a CPU (processor), a ROM, a RAM, a back-up RAM (and/or a non-volatile memory) and an interface I/F. The CPU realizes/implements various functions described later by executing instructions (routines) stored in the memory (ROM). At least one of functions implemented by the ECU 10 may be realized by a plurality of ECUs.

The regenerative brake device 20 includes a generator motor 21, a battery 22, an inverter 23, and a transmission 24. The generator motor 21 is constituted by an alternating-current (AC) synchronous motor. An output shaft of the generator motor 21 is connected to a front left wheel WFL and a front right wheel WFR (hereinafter, both are referred to as "front wheels WF") through the transmission 24 in such a manner that a power is able to be transmitted between the output shaft and the front wheels WF. The battery 22 is constituted by a secondary battery that is able to be repetitively charged and discharged (i.e., rechargeable) such as a lithium-ion battery. It should be noted that the battery 22 can be any type of electric storage device as long as it is rechargeable, and thus, may be not only the lithium-ion battery but also one of a nickel hydride battery, a lead battery, a nickel-cadmium battery, and other secondary batteries. The regenerative brake device 20 also functions as a driving device that drives the front wheels WF when an acceleration pedal 48a is pressed. The acceleration pedal 48a may sometimes be referred to as an "acceleration operation element".

The inverter 23 is electrically connected to the battery 22. When the generator motor 21 functions as a generator, the generator motor 21 converts rotational (kinetic) energy of the front wheels WF into electrical energy. The inverter 23 converts AC power provided from the generator motor 21 into DC power and supplies the DC power to the battery 22. This causes the battery 22 to be charged. At the same time, the regenerative brake force is applied to the front wheels WF. Whereas, when the generator motor 21 functions as a motor, the inverter 23 converts the DC power provided from the battery 22 into the AC power and supplies the AC power to the generator motor 21. This drives the generator motor 21, and a driving force is applied to the front wheels WF.

In this manner, it can be said that the generator motor 21 is an actuator for braking that applies the regenerative brake force to the front wheels WF and an actuator of driving that applies the driving force to the front wheels WF. A braking by the regenerative brake device 20 may sometimes be referred to as a "regenerative brake".

The friction brake device 30 includes a hydraulic circuit 31, and a frictional braking mechanisms 32FL, 32FR, 32RL, 32RR. Hereinafter, an element provided to each of the wheels is given a reference number with a suffix, such as a suffix FL representing the front left wheel WFL, a suffix FR representing the front right wheel WFR, a suffix RL representing the rear left wheel WRL, and a suffix RR representing the rear right wheel WRR. Those suffixes are omitted when it is not necessary to specify what wheel the element is provided to.

The hydraulic circuit 31 is arranged between an unillustrated master cylinder and each of the frictional braking mechanisms 32. The master cylinder pressurizes working oil using a force on a brake pedal 50a. The frictional braking mechanisms 32 are provided to the front left wheel WFL, the front right wheel WFR, the rear left wheel WRL, and the rear right wheel WRR. The hydraulic circuit 31 includes an unillustrated reservoir, an unillustrated oil pump, and unillustrated various valve devices, so as to function as a brake actuator. The hydraulic circuit 31 supplies pressure of the working oil (hereinafter, referred to as "oil pressure") to a wheel cylinder that is built in a brake caliper 33 of each of the frictional braking mechanisms 32. An unillustrated brake pad is pressed against each of wheel discs 35 with the oil pressure provided to the wheel cylinder so that the friction brake force is generated.

The brake pedal 50a may sometimes be referred to as a "deceleration operation element". A braking by the friction brake device 30 may sometimes be referred to as a "friction brake". A braking by the regenerative brake device 20 may sometimes be referred to as the "regenerative brake".

The ECU 10 is connected to a frontward camera 40, a millimeter wave radar 42, an acceleration sensor 44, a vehicle speed sensor 46, an acceleration pedal operation amount sensor 48, a brake pedal operation amount sensor 50, and an eco-mode switch 52.

The frontward camera 40 takes a picture of a scene in front of the vehicle VA to obtain image data. The frontward camera 40 obtains first external information based on the image data, and transmits the first external information to the ECU 10. The first external information includes the following information.
- a position of an object (e.g., an other vehicle, a pedestrian, and a road sign) that is present in front of the vehicle VA with respect to the vehicle VA.
- a position of a boundary BL (e.g., a while line and a guard rail) that defines a traveling area (traveling lane) of the vehicle VA with respect to the vehicle VA.
- a position of a road marking on a surface of a road of the traveling area with respect to the vehicle VA.

The millimeter wave radar 42 obtains second external information by transmitting/radiating millimeter wave frontward of the vehicle VA and receiving reflection wave. The radiated millimeter wave is reflected by an object at a reflection point of the object, and is changed into the reflection wave. The second external information includes "a position of that object with respect to the vehicle VA" and "a relative speed Vr of that object with respect to the vehicle VA". The millimeter wave radar 42 transmits the second external information to the ECU 10.

The acceleration sensor 44 detects an acceleration G in a front-rear direction of the vehicle VA. The vehicle speed sensor 46 detects/measures a vehicle speed Vs indicative of a speed of the vehicle VA. The acceleration pedal operation amount sensor 48 detects an acceleration operation amount AP indicative of an operation amount of the acceleration pedal 48a. The brake pedal operation amount sensor 50 detects a brake operation amount BP indicative of an operation amount of the brake pedal 50a. The ECU 10 obtains detection values from these sensors 44 to 50.

The eco-mode switch 52 is displaced at a position in such a manner that a driver can operate it. The driver can set (a running mode of) the vehicle VA to either one of a normal mode and an eco-mode. The eco-mode is a mode for improving a fuel consumption as compared to the normal mode. The driver operates the eco-mode switch 52 in order to set (the running mode of) the vehicle VA to the eco-mode and in order to cancel the eco-mode. When the eco-mode switch 52 is operated by the driver, the ECU 10 detects the operation to the eco-mode switch 52.

(Deceleration Control)

The ECU 10 determines, based on the first external information and the second external information, whether or not a predetermined execution condition is satisfied. The execution condition includes a condition that is to be satisfied when a predetermined deceleration objective target object is present, the deceleration objective target object being an object for which the vehicle VA should be decelerated. More specifically, the ECU 10 determines that the execution condition is satisfied, when a "condition that the deceleration objective target object is present within a start distance from the vehicle VA" and a "condition that the driver has his/her intention (deceleration intention) to decelerate the vehicle VA" are both satisfied.

The deceleration objective target object may include a preceding vehicle, a curved road, a stopping indicating object. The preceding vehicle is a vehicle (an other vehicle) that is present in front of the vehicle VA and is traveling in the same traveling area (traveling lane) in which the vehicle VA is traveling. The stopping indicating object is an object that requires the vehicle VA to stop, such as a stop sign, a stop road marking, and a red traffic light.

In one example, the ECU 10 determines that the driver has the deceleration intention when it determines, based on the acceleration operation amount AP, that the driver has been releasing the acceleration pedal 48a. In another example, the ECU 10 may determine that the driver has the deceleration intention when it detects an operation of a specific switch that is to be operated in order for the driver to indicate his/her deceleration intention.

Furthermore, the ECU 10 may determine whether or not the driver has the deceleration intention based on biological information of the driver. For example, the ECU 10 may determine that the driver has the deceleration intention when a "state in which a line of sight of the driver is in a direction toward the deceleration objective target object" continues for a predetermined time. Alternatively, the ECU 10 may determine that the driver has the deceleration intention when it recognizes/detects "a specific brain wave of the driver" or "an utterance that the driver has the deceleration intention".

The ECU 10 performs the deceleration control when it determines that the execution condition becomes satisfied. As described in (A) to (C) below, a mode of the deceleration control varies depending on (a kind of) the deceleration objective target object.

(A) When the deceleration objective target object is the preceding vehicle PV (refer to FIG. 2), the deceleration control is performed in such a manner that an inter-vehicular distance Dv between the preceding vehicle PV and the vehicle VA becomes equal to a set distance Dset that has been set in advance, and the relative speed Vr of the preceding vehicle PV becomes equal to "0".

More specifically, the ECU 10 obtains a target deceleration Gdtgt using the following equation (1).

$$Gdtgt = ka1 \cdot (k1 \cdot \Delta D + k2 \cdot Vr) \quad (1)$$

Each of ka1, k1, and k2 is a predetermined positive gain. $\Delta D$ is a value obtained by subtracting the inter-vehicular distance Dv from the set distance Dset. Vr is the relative speed of the preceding vehicle PV with respect to the vehicle VA.

(B) When the deceleration objective target object is the curved road Cv (refer to FIG. 3), the deceleration control is performed in such a manner that the vehicle speed Vs becomes equal to "a curved road target vehicle speed Vcv that enables the vehicle VA to travel stably in the curved road Cv". The curved road target vehicle speed Vcv has been specified in a curved road target vehicle speed map described later.

More specifically, the ECU 10 obtains a target deceleration Gdtgt using the following equation (2).

$$Gdtgt = ka2 \cdot \Delta Vcv \quad (2)$$

ka2 is a predetermined positive gain. $\Delta Vcv$ is a value obtained by subtracting the curved road target vehicle speed Vcv from the vehicle speed Vs.

(C) When the deceleration objective target object is the stopping indicating object (refer to FIG. 4), the deceleration control is performed in such a manner that the vehicle VA stops at a position a predetermined distance before the stopping indicating object.

More specifically, the ECU 10 obtains a target deceleration Gdtgt using the following equation (3) when the execution condition becomes satisfied in a case where the deceleration objective target object is the stopping indicating object.

$$Gdtgt = ka3 \cdot \Delta Vst \quad (3)$$

ka3 is a predetermined positive gain. $\Delta Vst$ is a value obtained by subtracting a stop target vehicle speed Vst from the vehicle speed Vs. The stop target vehicle speed Vst is a vehicle speed for the vehicle VA to stop at the position the predetermined distance before the stopping indicating object.

In the deceleration controls of (A) to (C) described above, the ECU 10 controls at least one of the regenerative brake device 20 and the friction brake device 30, in such a manner that a total/sum of the regenerative brake force and the friction brake force becomes equal to "a target brake force Ftgt that causes the acceleration G to become equal to the target deceleration Gdtgt".

A maximum regenerative brake force (hereinafter, referred to as a "capable regenerative brake force") that the regenerative brake device 20 is capable of generating varies depending on a state of charge of the battery 22. The ECU 10 determines a maximum regenerative brake force (hereinafter, referred to as a "maximum regenerative brake force") Fkmax that the regenerative brake device 20 can generate most (as much as possible) during the deceleration control. For example, the ECU 10 sets the maximum regenerative brake force Fkmax at a value of 80% of the capable regenerative brake force in normal times.

When the target brake force Ftgt is greater than the maximum regenerative brake force Fkmax, the ECU 10 causes the regenerative brake device 20 to generate the maximum regenerative brake force Fkmax, and caused the friction brake device 30 to generate a brake force that is equal to a value obtained by subtracting the maximum regenerative brake force Fkmax from the target brake force Ftgt.

(Outline of Operation)

When the ECU 10 determines that the execution condition becomes satisfied, the ECU 10 determines, based on the first external information and the second external information, whether or not a friction condition is satisfied. The friction condition is a condition to be satisfied when it is predicted that the target brake force Ftgt will become greater than a predetermined brake force threshold Fth. Examples of the friction condition will be described later. When the friction condition is determined to be satisfied, the ECU 10 makes the maximum regenerative brake force Fkmax smaller than when the friction condition is not determined to be satisfied.

As described above, it is necessary to switch from the regenerative brake to the friction brake when a great brake force needs to be generated. According to the present embodiment, when it is determined, based on the first external information and the second external information, that the friction condition is satisfied, the maximum regenerative brake force Fkmax becomes smaller than when it is determined that the friction condition is not satisfied. Accordingly, since the maximum regenerative brake force Fkmax has been small in advance when it is predicted that the great brake force will be generated, a time length (switching time length) necessary for the above-described switching can be short.

In addition, the ECU 10 determines whether or not a regenerative condition is satisfied when the ECU 10 determines that the execution condition becomes satisfied. The regenerative condition is a condition to be satisfied when it is inferred that the driver desires the deceleration control in which the regenerative brake force is prioritized. Examples of the regenerative condition will be described later. When the regenerative condition is determined to be satisfied, the ECU 10 makes the maximum regenerative brake force Fkmax greater than when the regenerative condition is not determined to be satisfied.

Accordingly, when it is likely that the driver desires the deceleration control in which the regenerative brake force is prioritized, the maximum regenerative brake force Fkmax is great. Therefore, the deceleration control in accordance with the driver's intention can be performed.

It should be noted that, when both of the friction condition and the regenerative condition are satisfied, the ECU 10 determines whether to increase or decrease the maximum regenerative brake force Fkmax in accordance with (depending on) a type/kind of the deceleration objective target object. This will be described later in detail.

(Friction Condition)

The ECU 10 determines that the friction condition is satisfied, when one of a first friction condition, a second friction condition, and a third friction condition is satisfied <First Friction Condition>

Figure 2:
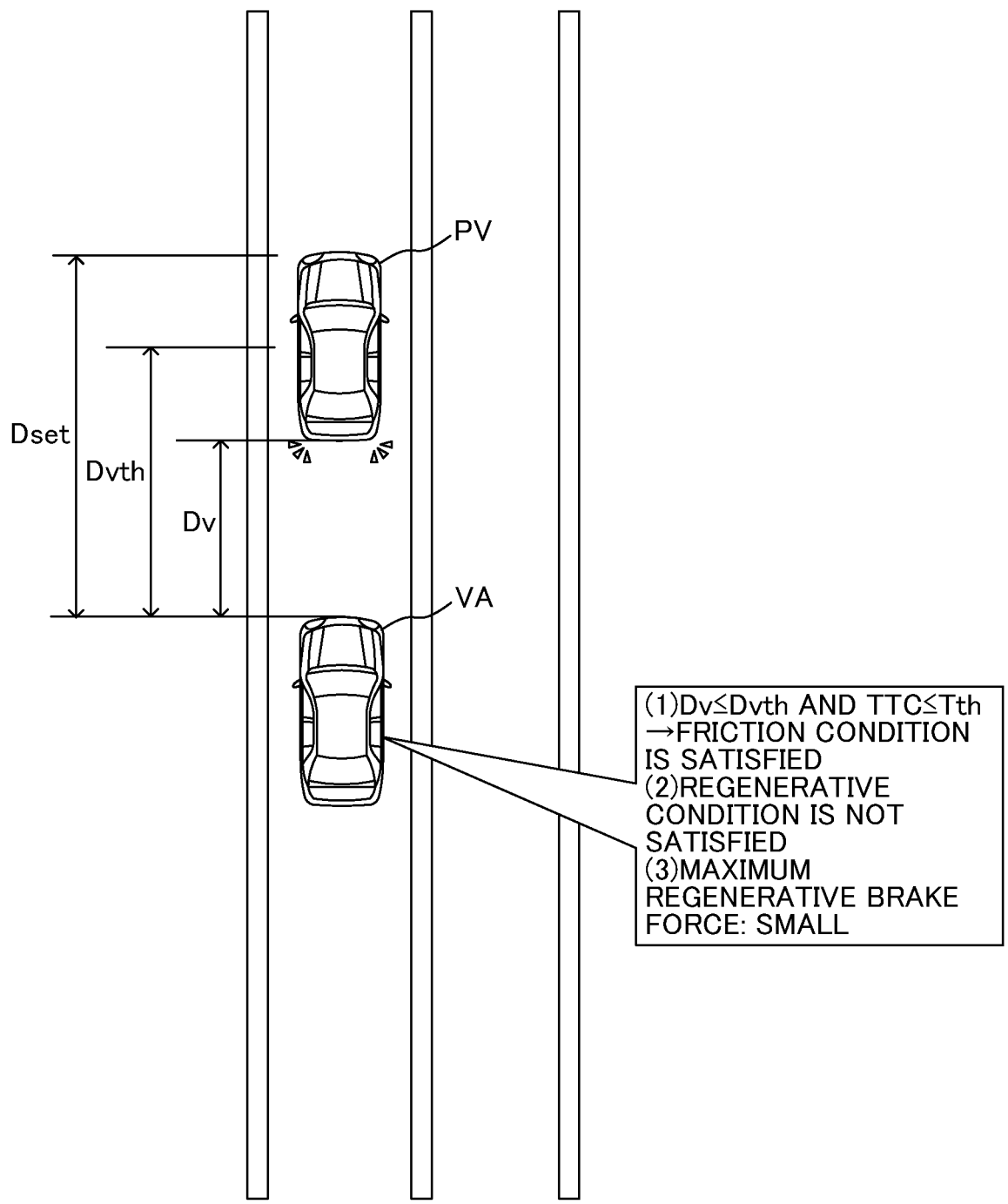
FIG. 2 is a drawing for describing an example of an operation of a deceleration control when a deceleration objective target object is a preceding vehicle.

As shown in FIG. 2, when the preceding vehicle PV is present in front of the vehicle VA, the ECU 10 obtains, based on the first external information and the second external information, the inter-vehicular distance Dv between the preceding vehicle PV and the vehicle VA (refer to FIG. 2), and a TTC (Time To Collision) of the preceding vehicle PV. The TTC represents a time for the vehicle VA to collide with the preceding vehicle PV. The EUC 10 obtains the TTC by dividing the inter-vehicular distance Dv by the relative speed Vr of the preceding vehicle.

When the inter-vehicular distance Dv is equal to or shorter than a distance threshold Dvth, and the TTC is equal to or shorter than a time threshold Tth, the ECU 10 determines that the first friction condition is satisfied. The distance threshold Dvth is set at a value shorter than the set distance Dset.

<Second Friction Condition>

Figure 3:
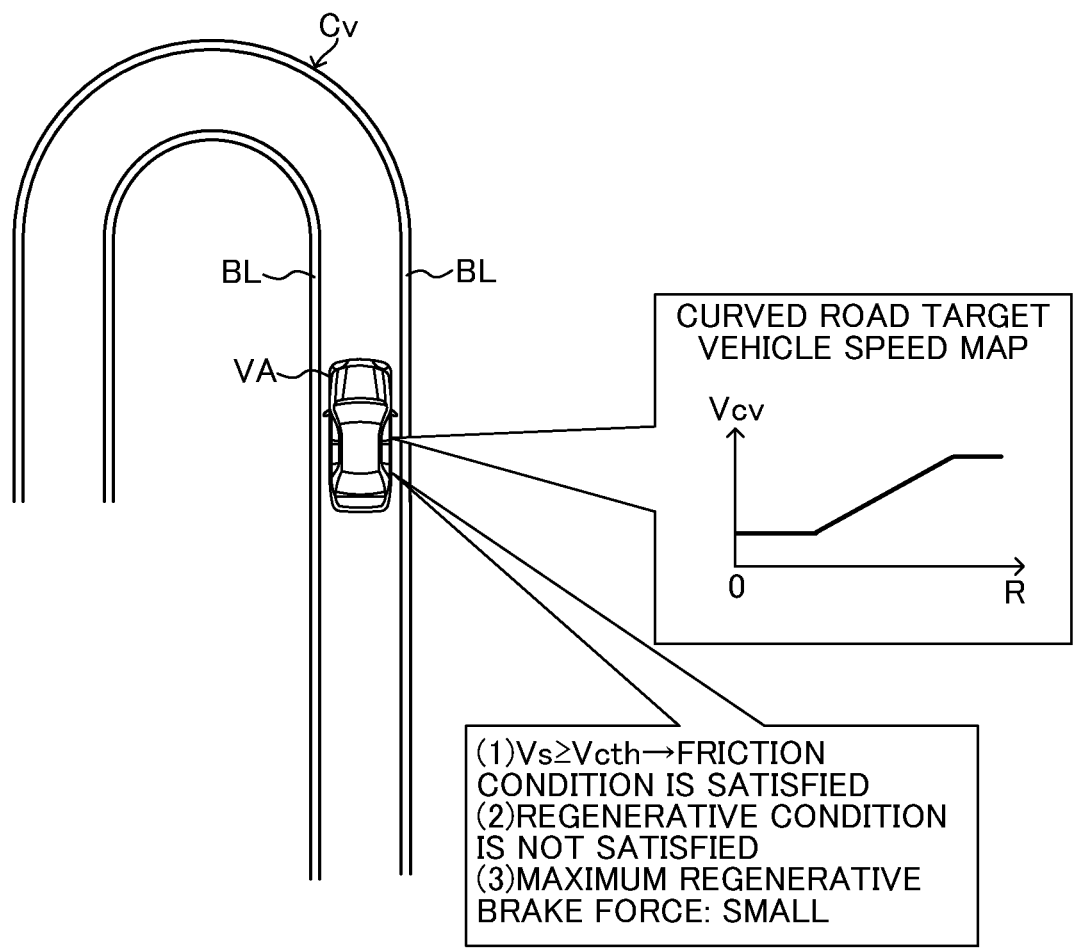
FIG. 3 is a drawing for describing an example of an operation of the deceleration control when a deceleration objective target object is a curved road.

As shown in FIG. 3, when the curved road Cv is present in front of the vehicle VA, the ECU 10 specifies, based on the first external information, a shape of the boundary BL (refer to FIG. 3) so as to obtain a curvature radius R. The ECU 10 applies the curvature radius R to the curved road target vehicle speed map shown in FIG. 3 so as to obtain the curved road target vehicle speed Vcv, and adds a predetermined value Dcv to the curved road target vehicle speed Vcv so as to obtain a curved road vehicle speed threshold (curved road speed threshold) Vcth. When the vehicle speed Vs is equal to or higher than the curved road vehicle speed threshold Vcth, the ECU 10 determines that the second friction condition is satisfied.

The curved road target vehicle speed map defines a relationship between the curvature radius R and the curved road target vehicle speed Vcv in such a manner that the curved road target vehicle speed Vcv is lower as the curvature radius R is smaller (i.e., as the curved road is sharper).

<Third Friction Condition>

When the stopping indicating object (in an example shown in FIG. 4, the stopping indicating object is the stop road marking) is present in front of the vehicle VA, the ECU 10 obtains a stop distance Ds representing a distance between the stopping indicating object and the vehicle VA. The ECU 10 applies the stop distance Ds to a stop target vehicle speed map shown in FIG. 4 so as to obtain the stop target vehicle speed Vst, and adds a predetermined value Dst to the stop target vehicle speed Vst so as to obtain a stop vehicle speed threshold (stop speed threshold) Vsth. When the vehicle speed Vs is equal to or higher than the stop vehicle speed threshold Vsth, the ECU 10 determines that the third friction condition is satisfied.

The stop target vehicle speed map defines a relationship between the stop distance Ds and the stop target vehicle speed Vst in such a manner that the stop target vehicle speed Vst is lower as the stop distance Ds is shorter.

When any of the first friction condition, the second friction condition, and the third friction condition is satisfied, it is likely that the target deceleration Gtgt becomes greater, and thus, it is predicted that the target brake force Ftgt will become equal to or greater than the predetermined brake force. In view of this, the ECU 10 determines that the friction condition is satisfied, when any of the first friction condition, the second friction condition, and the third friction condition is satisfied.

(Regenerative Condition)

When any of a first regenerative condition, a second regenerative condition, a third regenerative condition, a fourth regenerative condition is satisfied, and a fifth regenerative condition is satisfied, the ECU 10 determines that the regenerative condition is satisfied.

<First Regenerative Condition>

The ECU 10 determines that the first regenerative condition is satisfied, when a driver's releasing rate Vre of the acceleration pedal 48a is equal to or greater than a first rate threshold Vreth1. It should be noted that, when a subtraction value obtained by subtracting "an acceleration operation amount AP' a predetermined time before the present time point" from "an acceleration operation amount AP at the present time point" is negative, the ECU 10 obtains, as the releasing rate Vre, an absolute value of the subtraction value. The releasing rate Vre is sometimes referred to as a "decreasing rate".

When the first regenerative condition is satisfied, the driver has been quickly/rapidly releasing the acceleration pedal 48a. In this case, it is likely that the driver desires to decelerate the vehicle VA rapidly. The regenerative brake has a property that the response time is short (its response is quick). In view of this, when the first regenerative condition is satisfied, the ECU 10 makes the maximum regenerative brake force Fkmax greater in order to decelerate the vehicle VA with the regenerative brake as much as possible.

<Second Regenerative Condition>

The ECU 10 determines that the second regenerative condition is satisfied, when the releasing rate Vre is equal to or lower than a second rate threshold Vreth2, and the target deceleration Gdtgt is equal to or smaller than a deceleration threshold Gdth. It should be noted that the second rate threshold Vreth2 has been set at a value smaller than the first rate threshold Vreth1. When the second regenerative condition is satisfied, the driver has been releasing the acceleration pedal 48a slowly. In this case, it is likely that the driver desires to decelerate the vehicle VA precisely and smoothly. The regenerative brake has a property that it can decelerate the vehicle VA precisely and smoothly. In view of this, when the second regenerative condition is satisfied, the ECU 10 makes the maximum regenerative brake force Fkmax greater in order to decelerate the vehicle VA with the regenerative brake as much as possible.

<Third Regenerative Condition>

The ECU 10 determines that the third regenerative condition is satisfied, when an absolute value of an operation rate Va representing a rate of increasing or decreasing the acceleration operation amount AP at the present time point is equal to or lower than a third rate threshold Vreth3. It should be noted that the third rate threshold Vreth3 has been set at a value smaller than the second rate threshold Vreth2. When the third regenerative condition is satisfied, the driver has been operating the acceleration pedal 48a slowly, and thus, it is likely that the driver desires to improve the fuel consumption of the vehicle VA. In view of this, when the third regenerative condition is satisfied, the ECU 10 makes the maximum regenerative brake force Fkmax greater in order to improve the fuel consumption of the vehicle VA.

<Fourth Regenerative Condition>

The ECU 10 determines that the fourth regenerative condition is satisfied, when the vehicle VA is coasting. More specifically, when the vehicle speed Vs is equal to or higher than a coasting speed threshold Vsdth, and neither the acceleration pedal 48a nor the brake pedal 50a has been operated for a predetermined time, the ECU 10 determines that the vehicle VA is coasting, and thus, determines that the fourth regenerative condition is satisfied. When the driver is letting the vehicle VA coast, it is likely that the driver desires to improve the fuel consumption of the vehicle VA. In view of this, when the fourth regenerative condition is satisfied, the ECU 10 makes the maximum regenerative brake force Fkmax greater in order to improve the fuel consumption of the vehicle VA.

<Fifth Regenerative Condition>

When the eco-mode is selected as the running mode of the vehicle VA, the ECU 10 determines that the fifth regenerative condition is satisfied, so as to make the maximum regenerative brake force Fkmax greater. This causes the battery 22 to be charged more so that the fuel consumption of the vehicle VA is improved.

Examples of Operation

In the example shown in FIG. 2, the deceleration objective target object is the preceding vehicle PV. It is now assumed that the inter-vehicular distance Dv of the preceding vehicle PV is equal to or shorter than the distance threshold Dvth, the TTC of the preceding vehicle PV is equal to or shorter than the time threshold Tth, and none of the regenerative conditions is satisfied. In this case, the ECU 10 determines that the first friction condition is satisfied, and thus, makes the maximum regenerative brake force Fkmax smaller.

In the example shown in FIG. 3, the deceleration objective target object is the curved road Cv. It is now assumed that the vehicle speed Vs is equal to or higher than the curved road vehicle speed threshold Vcth, and none of the regenerative conditions is satisfied. In this case, the ECU 10 determines that the second friction condition is satisfied, and thus, makes the maximum regenerative brake force Fkmax smaller.

Figure 4:
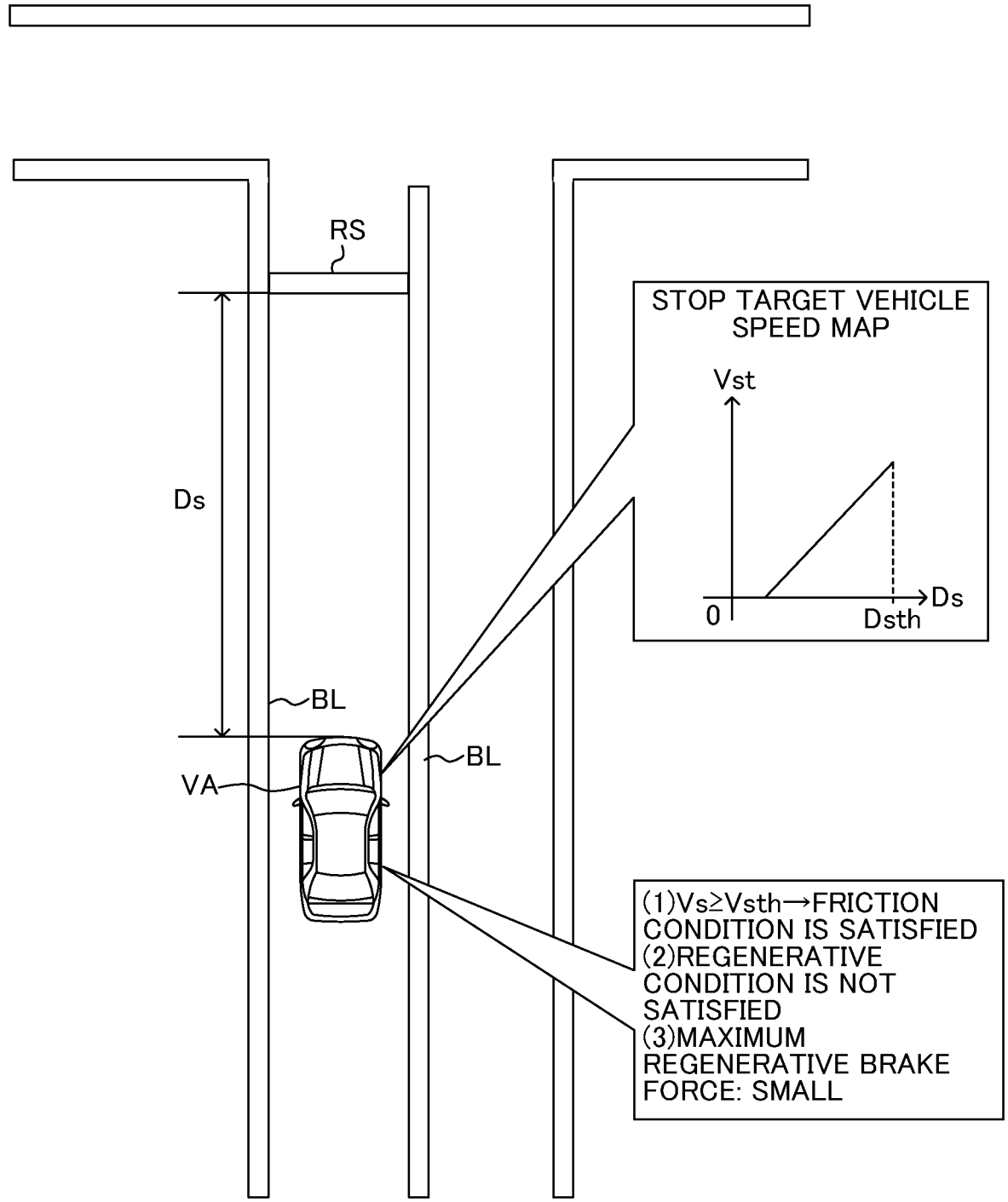
FIG. 4 is a drawing for describing an example of an operation of the deceleration control when a deceleration objective target object is a stop road marking.

In the example shown in FIG. 4, the deceleration objective target object is the stopping indicating object. It is now assumed that the vehicle speed Vs is equal to or higher than the stop vehicle speed threshold Vsth, and none of the regenerative conditions is satisfied. In this case, the ECU 10 determines that the third friction condition is satisfied, and thus, makes the maximum regenerative brake force Fkmax smaller.

In each of the examples shown in FIGS. 2 to 4, it is now assumed that both of the friction condition and the regenerative conditions are satisfied. In this case, the ECU 10 determines whether to make the maximum regenerative brake force Fkmax smaller or greater depending on the kind of the deceleration objective target object.

More specifically, when the deceleration objective target object is the preceding vehicle PV (refer to FIG. 2), the ECU 10 makes the maximum regenerative brake force Fkmax smaller. This is because, if the deceleration is not sufficient, it is likely that the vehicle VA contacts (collide) with the preceding vehicle PV. When the deceleration objective target object is the curved road Cv (refer to FIG. 3), or when the deceleration objective target object is the stopping indicating object (refer to FIG. 4), the ECU 10 makes the maximum regenerative brake force Fkmax greater. This is because, even if the deceleration is not sufficient, it is unlikely that the vehicle VA contacts (collide) with the other object.

(Specific Operation)
<Deceleration Control>

Figure 5:
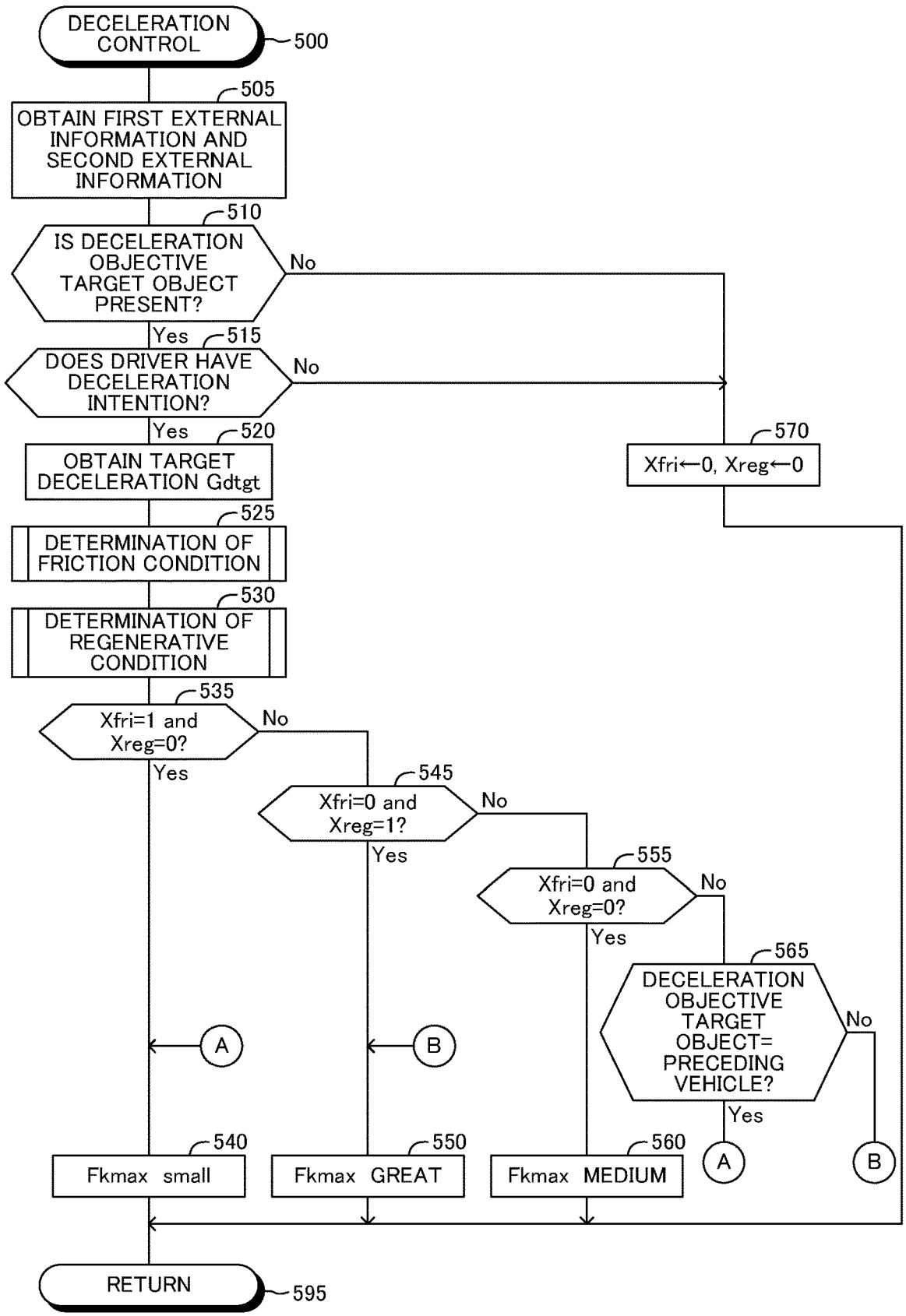
FIG. 5 is a flowchart illustrating a deceleration control routine executed by a CPU of a vehicle control ECU shown in FIG. 1.

The CPU of the ECU 10 executes a routine shown by a flowchart in FIG. 5 every time a predetermined time elapses.

When an appropriate time point comes, the CPU starts processing from step 500 in FIG. 5, and sequentially executes the processes of step 505 and step 510.

Step 505: the CPU obtains the first external information from the frontward camera 40, and the second external information from the millimeter wave radar 42.

Step 510: the CPU determines, based on the first external information and the second external information, whether or not the deceleration objective target object is present.

When the deceleration objective target object is present, the CPU makes a "Yes" determination at step 510, and proceeds to step 515. At step 515, the CPU determines whether or not the driver has the deceleration intention.

When the driver has the deceleration intention, the CPU makes a "Yes" determination at step 515, and executes the processes of step 520 to step 535.

Step 520: The CPU obtains the target deceleration Gdtgt depending on (in accordance with) the kind of the deceleration objective target object, as described above.

Step 525: The CPU executes a friction condition determination routine for determining whether or not the friction condition is satisfied. The friction condition determination routine will be described later in detail with reference to FIG. 6.

Step 530: The CPU executes a regenerative condition determination routine for determining whether or not the regenerative condition is satisfied. The generative condition determination routine will be described later in detail with reference to FIG. 7.

Step 835: The CPU determines whether or not a condition that a value of a friction flag Xfri is "1" and a value of a regenerative flag Xreg is "0" is satisfied.

The value of the friction flag Xfri is set to "1" when the friction condition becomes satisfied, and is set to "0" when the friction condition is not satisfied. The value of the friction flag Xfri is set to "0" in an initialization routine. The initialization routine is a routine executed by the CPU when a position of an unillustrated ignition key switch of the vehicle VA is switched from an off position to an on position.

The value of the regenerative flag Xreg is set to "1" when the regenerative condition becomes satisfied, and is set to "0" when the regenerative condition is not satisfied. The value of the regenerative flag Xreg is set to "0" in the initialization routine.

When the condition that the value of the friction flag Xfri is "1" and the value of the regenerative flag Xreg is "0" is satisfied (namely, when the friction condition is satisfied and the regenerative condition is not satisfied), the CPU makes a "Yes" determination at step 535, and proceeds to step 540.

At step 540, the CPU sets the maximum regenerative brake force Fkmax to a value smaller than a normal value set/used in the normal times, and performs the deceleration control. For example, the CPU sets the maximum regenerative brake force Fkmax to a value of 30% of the capable regenerative brake force. During the deceleration control, the CPU controls the regenerative brake device 20 and the friction brake device 30, in such a manner that the total/sum of the regenerative brake force and the friction brake force becomes equal to the target brake force Ftgt. Thereafter, the CPU proceeds to step 595 to terminate the present routine tentatively.

Whereas, when the condition that the value of the friction flag Xfri is "1" and the value of the regenerative flag Xreg is "0" is not satisfied, the CPU makes a "No" determination at step 535, and proceeds to step 545.

At step 545, the CPU determines whether a condition that the value of the friction flag Xfri is "0" and the value of the regenerative flag Xreg is "1" is satisfied.

When the condition that the value of the friction flag Xfri is "0" and the value of the regenerative flag Xreg is "1" is satisfied (namely, when the friction condition is not satisfied, and the regenerative condition is satisfied), the CPU makes a "Yes" determination at step 545, and proceeds to step 550.

At step 550, the CPU sets the maximum regenerative brake force Fkmax to a value greater than the normal value set/used in the normal times, and performs the deceleration control. For example, the CPU sets the maximum regenerative brake force Fkmax to a value of 90% of the capable regenerative brake force. Thereafter, the CPU proceeds to step 595 to terminate the present routine tentatively.

Whereas, when the condition that the value of the friction flag Xfri is "0" and the value of the regenerative flag Xreg is "1" is not satisfied, the CPU makes a "No" determination at step 545, and proceeds to step 555.

At step 555, the CPU determines whether a condition that the value of the friction flag Xfri and the value of the regenerative flag Xreg are both "0" is satisfied.

When the condition that the value of the friction flag Xfri and the value of the regenerative flag Xreg are both "0" is satisfied, the CPU makes a "Yes" determination at step 555, and proceeds to step 560.

At step 560, the CPU sets the maximum regenerative brake force Fkmax to the normal (medium) value, and performs the deceleration control. For example, the CPU sets the maximum regenerative brake force Fkmax to a value of 80% of the capable regenerative brake force. Thereafter, the CPU proceeds to step 595 to terminate the present routine tentatively.

When the value of the friction flag Xfri and the value of the regenerative flag Xreg are both "1" at a time point at which the CPU proceeds to step 555, the CPU makes a "No" determination at step 555, and proceeds to step 565. At step 565, the CPU determines whether or not the deceleration objective target object is the preceding vehicle PV.

When the deceleration objective target object is the preceding vehicle PV, the CPU makes a "Yes" determination at step 565, and proceeds to step 540 so as to set the maximum regenerative brake force Fkmax to the value smaller than the normal value set/used in the normal times.

If the deceleration objective target object is not the preceding vehicle PV (namely, when the deceleration objective target object is either the curved road or the stopping indicating object), the CPU makes a "No" determination at step 565, and proceeds to step 550 so as to set the maximum regenerative brake force Fkmax to the value greater than the normal value set/used in the normal times.

If the deceleration objective target object is not present when the CPU proceeds to step 510, the CPU makes a "No" determination at step 510, and proceeds to step 570. If the driver does not have the deceleration intention when the CPU proceeds to step 515, the CPU makes a "No" determination at step 515, and proceeds to step 570. At step 570, the CPU sets both of the value of the friction flag Xfri and the value of the regenerative flag Xreg to "0". Thereafter, the CPU proceeds to step 595 to terminate the present routine tentatively.

<Friction Condition Determination>

Figure 6:
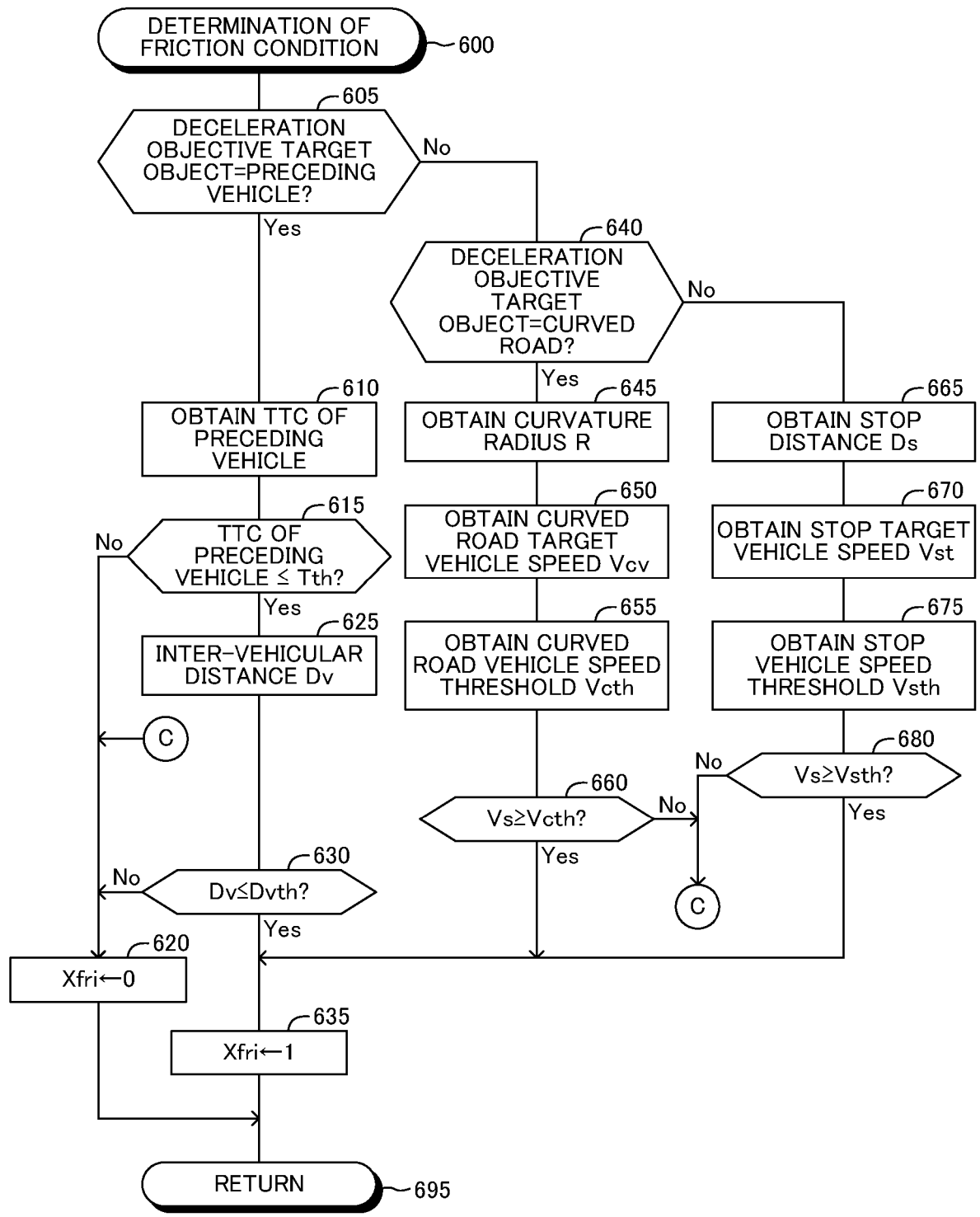
FIG. 6 is a flowchart illustrating a friction condition determination sub routine executed by the CPU of the vehicle control ECU shown in FIG. 1.

When the CPU proceeds to step 525, the CPU starts processing from step 600 in FIG. 6, and proceeds to step 605. At step 605, the CPU determines whether or not the deceleration objective target object is the preceding vehicle PV.

When the deceleration objective target object is the preceding vehicle PV, the CPU makes a "Yes" determination at step 605, and executes the processes of step 610 and step 615.

Step 610: The CPU obtains the TTC of the preceding vehicle PV.

Step 615: The CPU determines whether or not the TTC is equal to or shorter than the time threshold Tth.

When the TTC is greater than the time threshold Tth, the CPU makes a "No" determination at step 615, and proceeds to step 620. At step 620, the CPU sets the value of the friction value Xfri to "0". Thereafter, the CPU proceeds to step 695 to terminate the present routine tentatively, and executes the process of step 530 shown in FIG. 5.

If the TTC is equal to or shorter than the time threshold Tth when the CPU proceeds to step 615, the CPU makes a "Yes" determination at step 615, and executes the processes of step 625 and step 630.

Step 625: The CPU obtains the inter-vehicular distance Dv to (of) the preceding vehicle PV.

Step 630: The CPU determines whether or not the inter-vehicular distance Dv is equal to or shorter than the distance threshold Dvth.

When the inter-vehicular distance Dv is greater than the distance threshold Dvth, the CPU makes a "No" determination at step 630, and proceeds to step 620. Whereas, when the inter-vehicular distance Dv is equal to or shorter than the distance threshold Dvth, the CPU makes a "Yes" determination at step 630, and proceeds to step 635. At step 635, the CPU sets the value of the friction value Xfri to "1". Thereafter, the CPU proceeds to step 695 to terminate the present routine tentatively, and executes the process of step 530 shown in FIG. 5.

If the deceleration objective target object is not the preceding vehicle PV, the CPU makes a "No" determination at step 605, and proceeds to step 640. At step 640, the CPU determines whether or not the deceleration objective target object is the curved road Cv.

When the deceleration objective target object is the curved road Cv, the CPU makes a "Yes" determination at step 640, and executes the processes of step 645 to step 660.

Step 645: The CPU obtains the curvature radius R of the curved road Cv.

Step 650: The CPU obtains the curved road target vehicle speed Vcv by applying the curvature radius R to the curved road target vehicle speed map.

Step 655: The CPU obtains the curved road vehicle speed threshold Vcth by adding the predetermined value Dcv to the curved road target vehicle speed Vcv.

Step 660: The CPU determines whether or not the vehicle speed Vs is equal to or higher than the curved road vehicle speed threshold Vcth.

When the vehicle speed Vs is equal to or higher than the curved road vehicle speed threshold Vcth, the CPU makes a "Yes" determination at step 660, and sets the value of the friction flag Xfri to "1" at step 635. Whereas, when the vehicle speed Vs is lower than the curved road vehicle speed threshold Vcth, the CPU makes a "No" determination at step 660, and sets the value of the friction flag Xfri to "0" at step 620.

If the deceleration objective target object is not the curved road Cv when the CPU proceeds to step 640 (namely, when the deceleration objective target object is the stopping indicating object), the CPU makes a "No" determination at step 640, and executes the processes of step 655 to step 680.

Step 665: The CPU obtains the stop distance Ds to the stopping indicating object.

Step 670: The CPU obtains the stop target vehicle speed Vst by applying the stop distance Ds to the stop target vehicle speed map.

Step 675: The CPU obtains the stop vehicle speed threshold Vsth by adding the predetermined value Dst to the stop target vehicle speed Vst.

Step 680: The CPU determines whether or not the vehicle speed Vs is equal to or higher than the stop vehicle speed threshold Vsth.

When the vehicle speed Vs is equal to or higher than the stop vehicle speed threshold Vsth, the CPU makes a "Yes" determination at step 680, and sets the value of the friction flag Xfri to "1" at step 635. Whereas, when the vehicle speed Vs is lower than the stop vehicle speed threshold Vsth, the CPU makes a "No" determination at step 680, and sets the value of the friction flag Xfri to "0" at step 620.

<Regenerative Determination>

Figure 7:
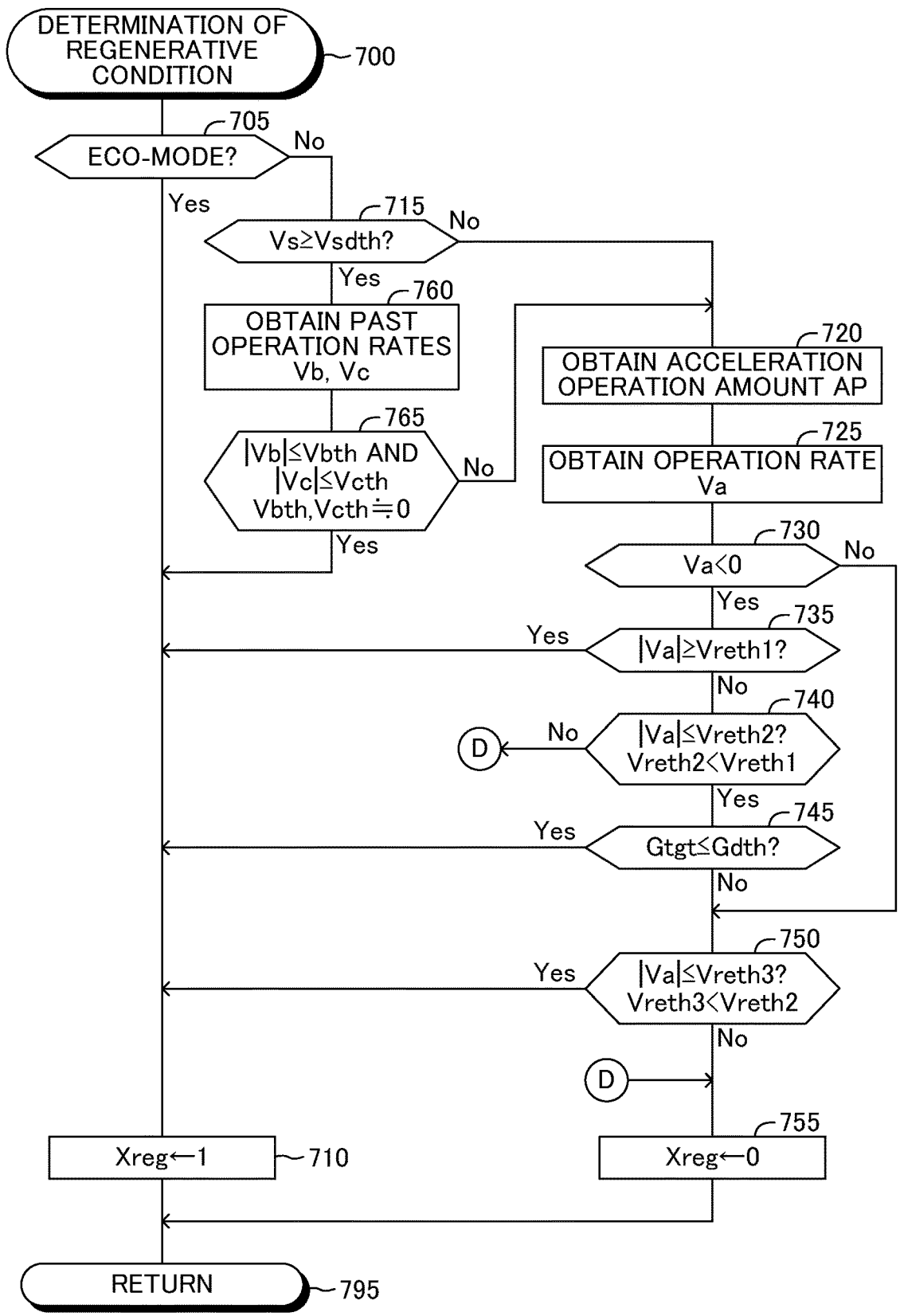
FIG. 7 is a flowchart illustrating a regenerative condition determination sub routine executed by the CPU of the vehicle control ECU shown in FIG. 1.

When the CPU proceeds to step 530, the CPU starts processing from step 700 in FIG. 7, and proceeds to step 705. At step 705, the CPU determines whether or not the vehicle VA has been set to the eco-mode.

When the vehicle VA has been set to the eco-mode (namely, when the fifth regenerative condition is satisfied), the CPU makes a "Yes" determination at step 705, and sets the value of the regenerative flag Xreg to "1" at step 710. Thereafter, the CPU proceeds to step 795 to terminate the present routine tentatively, and executes the process of step 535 shown in FIG. 5.

When the vehicle VA has not been set to the eco-mode, the CPU makes a "No" determination at step 705, and proceeds to step 715. At step 715, the CPU determines whether or not the vehicle speed Vs is equal to or higher than the coasting speed threshold Vsdth.

When the vehicle speed Vs is lower than the coasting speed threshold Vsdth, the CPU makes a "No" determination at step 715, and executes the processes of step 720 to step 730.

Step 720: The CPU obtains the acceleration operation amount AP at the present time point.

Step 725: The CPU obtains the operation rate Va by dividing the subtraction value obtained by subtracting "the acceleration operation amount AP at the time point the predetermined time before the present time point" from "the acceleration operation amount AP at the present time point" by the predetermined time.

Step 730: The CPU determines whether or not the operation rate Va is smaller than zero (namely, whether or not the driver has performed an operation to release the acceleration pedal 48a).

When the operation rate Va is smaller than zero, the CPU makes a "Yes" determination at step 730, and proceeds to step 735. At step 735, the CPU determines whether or not the absolute value of the operation rate Va is equal to or greater than the first rate threshold Vreth1.

When the absolute value of the operation rate Va is equal to or greater than the first rate threshold Vreth1 (namely, when the first regenerative condition is satisfied), the CPU makes a "Yes" determination at step 735, and sets the value of the regenerative flag Xreg to "1" at step 710.

Whereas, when the absolute value of the operation rate Va is smaller than the first rate threshold Vreth1, the CPU makes a "No" determination at step 735, and proceeds to step 740. At step 740, the CPU determines whether or not the absolute value of the operation rate Va is equal to or smaller than the second rate threshold Vreth2.

When the absolute value of the operation rate Va is equal to or smaller than the second rate threshold Vreth2, the CPU makes a "Yes" determination at step 740, and proceeds to step 745. At step 745, the CPU determines whether or not the target deceleration Gtgt is equal to or smaller than the deceleration threshold Gdth.

When the target deceleration Gtgt is equal to or smaller than the deceleration threshold Gdth (namely, when the second regenerative condition is satisfied), the CPU makes a "Yes" determination at step 745, and sets the value of the regenerative flag Xreg to "1" at step 710.

Whereas, when the target deceleration Gtgt is greater than the deceleration threshold Gdth, the CPU makes a "No" determination at step 745, and proceeds to step 750. At step 750, the CPU determines whether or not the absolute value of the operation rate Va is equal to or smaller than the third rate threshold Vreth3.

When the absolute value of the operation rate Va is equal to or smaller than the third rate threshold Vreth3 (namely, when the third regenerative condition is satisfied), the CPU makes a "Yes" determination at step 750, and sets the value of the regenerative flag Xreg to "1" at step 710.

Whereas, when the absolute value of the operation rate Va is greater than the third rate threshold Vreth3, the CPU makes a "No" determination at step 750, and proceeds to step 755. At step 755, the CPU sets the value of the regenerative flag Xreg to "0". Thereafter, the CPU proceeds to step 795 to terminate the present routine tentatively, and executes the process of step 535 shown in FIG. 5.

If the operation rate Va is equal to or greater than zero when the CPU proceeds to step 730, the CPU makes a "No" determination at step 730, and proceeds to step 750.

If the vehicle speed Vs is equal to or higher than the coasting speed threshold Vsdth when the CPU proceeds to step 715, the CPU makes a "Yes" determination at step 715, and executes the processes of step 760 to step 765.

Step 760: The CPU obtains a past operation rate Vb of the acceleration pedal 48a and a past operation rate Vc of the brake pedal 50a.

Step 765: The CPU determines whether or not a condition that an absolute value of the past operation rate Vb is equal to or smaller than a rate threshold Vbth and an absolute value of the past operation rate Vc is equal to or smaller than a rate threshold Vcth is satisfied. It should be noted that the rate threshold Vbth and the rate threshold Vcth have been both set at around zero.

When the above-described condition is satisfied (namely, when the fourth regenerative condition is satisfied), the CPU makes a "Yes" determination at step 765, and sets the value of the regenerative flag Xreg to "1" at step 710. Whereas, when the above-described condition is not satisfied, the CPU makes a "No" determination at step 765, and proceeds to step 720.

In this manner, since the above-described embodiment determines, based on the first external information and the second external information, whether or not the friction condition is satisfied, it can make the maximum regenerative brake force Fkmax smaller before the great brake force is required. Thus, the switching time length can be shortened.

The present disclosure should not be limited to the above-described embodiment, and may employ various modifications within the scope of the present disclosure.

At step 540 shown in FIG. 5, the CPU may set the maximum regenerative brake force Fkmax to "0". In this case, the friction brake device 30 generates the entire target brake force Ftgt.

In the above-described embodiment, the execution condition for the deceleration control includes the deceleration intention condition that the driver has the deceleration intention, however, the execution condition for the deceleration control may not include the deceleration intention condition.

In the above-described embodiment, the first friction condition includes the condition that the inter-vehicular distance Dv is equal to or shorter than the distance threshold Dvth, however, the first friction condition may not include the condition that the inter-vehicular distance Dv is equal to or shorter than the distance threshold Dvth. Furthermore, the first friction condition includes the TTC condition that the TTC is equal to or shorter than the time threshold Tth, however, the first friction condition may include a condition that an approaching relative speed Vrs of the preceding vehicle PV to the vehicle VA is equal to or higher than a speed threshold Vrsth, in place of the TTC condition. The TTC and the approaching relative speed Vrs may be referred to as a "collision indicative value".

The present apparatus may not include the millimeter wave radar 42. In the above-described embodiment, the regenerative brake device 20 is configured to apply the regenerative brake force only to the front wheels FW, however, the regenerative brake device 20 may be configured to apply the regenerative brake force not only to the front wheels FW but also to the rear wheels WR. Alternatively, the regenerative brake device 20 may be configured to apply the regenerative brake force only to the rear wheels WR.

The present apparatus may be applied to (or installed in/on) an engine vehicle, a hybrid electric vehicle (HEV), a plug-in hybrid electric vehicle (PHEV), a fuel cell electric vehicle (FCEV), and a battery electric vehicle (BEV). The present apparatus 10 can also be applied to an autonomous control vehicle. In addition, the present disclosure may include a non-volatile storage device/medium (readable and writable memory) in which a program for realizing the functions of the present apparatus is stored and from which the program is read out by the computer.

What is claimed is:

1. A vehicle control apparatus comprising:
   a sensor that obtains object information on an object that is present in front of a vehicle;
   a regenerative brake device that applies a regenerative brake a wheel of said vehicle;
   a friction brake device that applies a friction brake force to said wheel; and
   a control unit that performs a deceleration control to control at least one of said regenerative brake device and said friction brake device, when it is determined, based on said object information, that an execution condition that a predetermined deceleration objective target object is present is satisfied, in such a manner that a total of said regenerative brake force and said friction brake force becomes equal to a target brake force obtained based on a relationship between said vehicle and said deceleration objective target object,
   wherein, said control unit is configured to make a maximum regenerative brake force that said regenerative brake device is able to generate during said deceleration control smaller when a friction condition is satisfied than when said friction condition is not satisfied, said friction condition being a condition to be satisfied when it is predicted, based on said object information, that said target brake force will become greater than a predetermined brake force,
   wherein,
   said control unit is configured to determine whether to make said maximum regenerative brake force greater or smaller depending on a kind of said deceleration objective target object when both of said friction condition and said regenerative condition are satisfied than when any of said friction condition and said regenerative condition is not satisfied.

2. The vehicle control apparatus according to claim 1, wherein,
said control unit is configured to make said maximum regenerative brake force greater when a regenerative condition is satisfied than when said regenerative condition is not satisfied, said regenerative condition being a condition to be satisfied when it is inferred that a driver desires a deceleration control in which said regenerative brake force is prioritized.

3. The vehicle control apparatus according to claim 1, wherein,
said control unit is configured to make said maximum regenerative brake force smaller if a kind of said deceleration objective target object is a preceding vehicle that is present in front of said vehicle and is traveling in the same direction as a traveling direction of said vehicle when both of said friction condition and said regenerative condition are satisfied than when any of said friction condition and said regenerative condition is not satisfied.

4. The vehicle control apparatus according to claim 1, wherein,
said control unit is configured to make said maximum regenerative brake force greater if a kind of said deceleration objective target object is either a curved road or a stopping indicating object to direct a stop of said vehicle when both of said friction condition and said regenerative condition are satisfied than when any of said friction condition and said regenerative condition is not satisfied.

5. The vehicle control apparatus according to claim 1, wherein,
said control unit is configured to determine that said friction condition is satisfied when any one of a first friction condition, a second friction condition, and a third friction condition is satisfied,
   said first friction condition being a condition to be satisfied when a collision indicative value between said vehicle and a preceding vehicle that is present in front of said vehicle and is traveling in the same direction as a traveling direction of said vehicle is equal to or greater than a threshold;
   said second friction condition being a condition to be satisfied when a curved road is present in front of said vehicle, and a speed of said vehicle is equal to or higher than a curved road speed threshold that is determined in accordance with a curvedness of said curved road; and
   said third friction condition being a condition to be satisfied when a stopping indicating object to direct a stop of said vehicle is present in front of said vehicle, and a speed of said vehicle is equal to or higher than a stop speed threshold that is determined in accordance with a distance to said stopping indicating object.

6. The vehicle control apparatus according to claim 1, wherein,
said control unit is configured to:
   apply a greater driving force to said vehicle as an operation amount of an acceleration operation element that is operated in order for said driver to accelerate said vehicle is greater; and
   determine whether or not said regenerative condition is satisfied based on a change in said operation amount.

7. The vehicle control apparatus according to claim 1, wherein,
said control unit is configured to determine that said regenerative condition is satisfied when any one of a first regenerative condition, a second regenerative condition, a third regenerative condition, and a fourth regenerative condition is satisfied, said first regenerative condition being a condition to be satisfied when a decreasing rate indicative of a decreasing amount of said operation amount per unit time is equal to or greater than a predetermined first rate threshold;

said second regenerative condition being a condition to be satisfied when said decreasing rate is equal to or smaller than a predetermined second rate threshold that is smaller than said first rate threshold, and said target brake force is equal to or smaller than a predetermined brake force threshold;

said third regenerative condition being a condition to be satisfied when an absolute value of an operation rate indicative of an increasing amount or a decreasing amount of said operation amount per unit time is equal to or smaller than a third rate threshold that is smaller than said second threshold amount; and said fourth regenerative condition being a condition to be satisfied when said speed of said vehicle is equal to or higher than a predetermined speed threshold, and neither said acceleration operation element nor a deceleration operation element that is operated in order for said driver to decelerate said vehicle has been operated for a predetermined time.

8. The vehicle control apparatus according to claim 1, wherein, said vehicle control apparatus is configured to be able to selectively set said vehicle to a normal mode or an eco-mode to improve a fuel consumption of said vehicle as compared to said normal mode; and said control unit is configured to determine that said regenerative condition is satisfied when said eco-mode is set.

* * * * *